Figure 1:
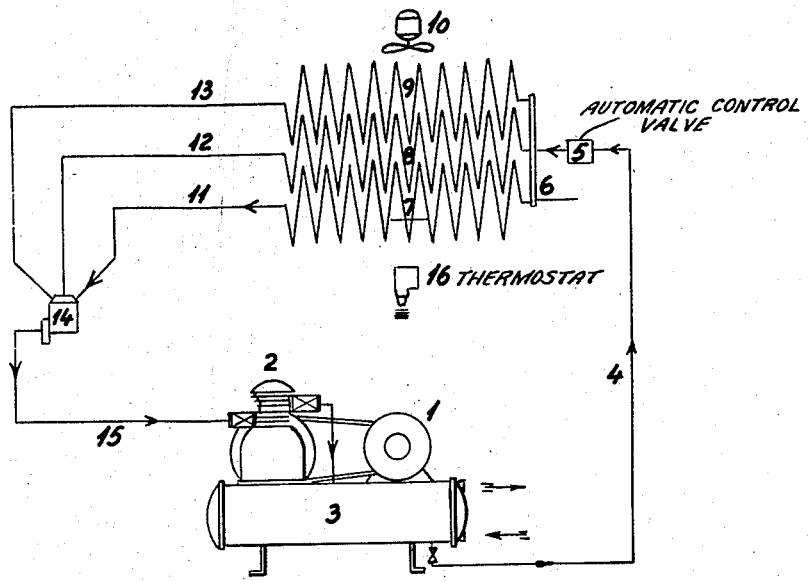

May 5, 1959   K. K. K. KRØYER   2,884,765
REFRIGERATING SYSTEMS
Filed Feb. 15, 1956   2 Sheets-Sheet 1

INVENTOR

KARL K. K. KRØYER

BY Watson, Cole, Grindle & Watson
ATTORNEYS

May 5, 1959     K. K. K. KRØYER     2,884,765
REFRIGERATING SYSTEMS
Filed Feb. 15, 1956
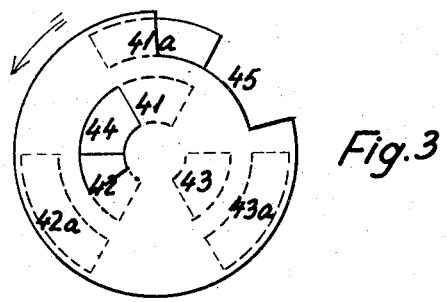
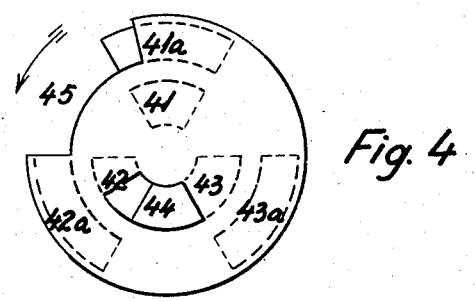
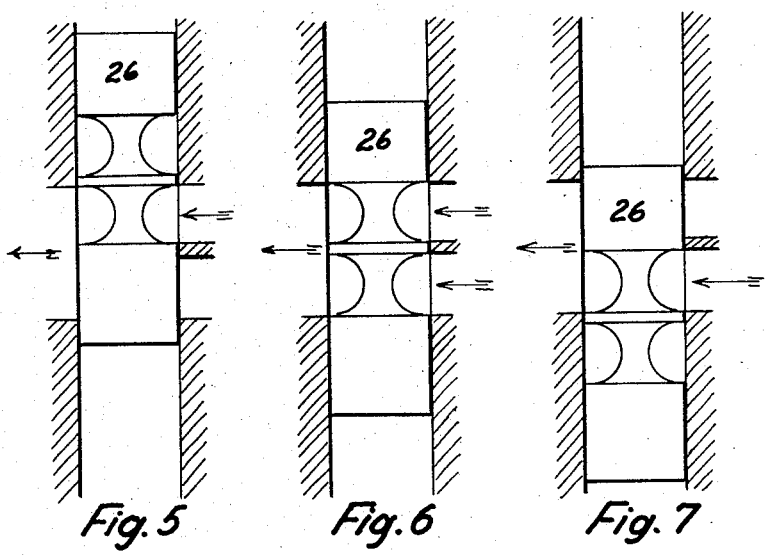
INVENTOR
KARL K. K. KRØYER
ATTORNEYS United States Patent Office 2,884,765
Patented May 5, 1959

2,884,765

REFRIGERATING SYSTEMS

Karl Kristian Kobs Kroyer, Aarhus, Denmark

Application February 15, 1956, Serial No. 565,713

Claims priority, application Denmark February 17, 1955

1 Claim. (Cl. 62—231)

This invention relates to refrigerating systems of the evaporation type having two or more alternatively active evaporators.

Refrigerating systems of this kind are used in order to avoid the necessity of defrosting the evaporators, and as disclosed in my co-pending application, Ser. No. 411,211 filed on February 18, 1954, these may in some cases be arranged very close together for the purpose of reducing to a minimum any disadvantageous travel of moisture and variations of humidity in the compartment being cooled by means of the refrigerating system.

The present invention has been devised particularly for use in connection with refrigerating systems of the last named kind, but may also be advantageously applied to refrigerating systems where the evaporators are located at a greater distance from one another, in some cases even in separate refrigerating compartments, the main object of the use of a plurality of evaporators being in these cases to obtain a particularly efficient utilization of the capacity of the refrigerating system, while the problems of travel of moisture and variations of humidity are of secondary importance, or can be completely disregarded.

In refrigerating systems of the general type above referred to, it has been proposed to perform the switching over operation between the various evaporators either by hand or automatically by means of electrically controlled valves, responsive to switching clocks or circuits constituting part of the electric equipment of the refrigerating system. When the switching over is performed by hand, there will be no guarantee that the periods of operation of the individual evaporators will be of suitable duration. On the other hand, the electric control systems are relatively complicated and may perform the switching over at improper times, taking into account that refrigerating systems of the kind in question are as a rule intermittently operating. Thus, it may occur that an evaporator is switched into the refrigerating circuit shortly after the system has been stopped, and is again switched off before it is restarted so that the evaporator in question will in fact not have performed the period of operation which it should have performed with a view to defrosting conditions. In less pronounced cases, the effective periods of operation of the various evaporators may unintentionally vary to a considerable extent.

It is an object of the present invention to provide simple and efficient means for performing the switching over operation in a system of the kind specified in an advantageous manner.

With this object in view, there is provided, according to the invention, in a system of the evaporation type having two or more alternatively active evaporators, a valve for automatically switching over between the various evaporators in response to the quantity of refrigerant vapor flowing through the system.

Figure 2:
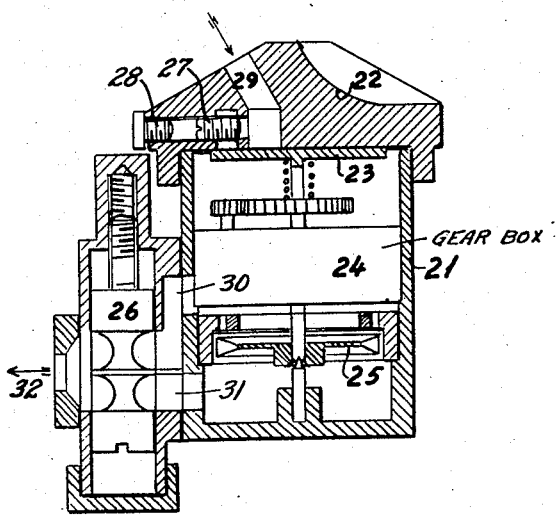

Other objects and features of the invention will appear from the following detailed description of an embodiment taken in conjunction with the accompanying drawings in which:

Fig. 1 shows a basic diagram of a refrigerating system in accordance with the principles of the invention, Fig. 2 a cross section through a switch-over valve forming part of the refrigerating system, Figs. 3 and 4 a diagrammatic illustration of the valve seat and the valve body of the valve shown in Fig. 2 in two different positions of the operating cycle, and Figs. 5, 6 and 7 a controllable by-pass valve associated with the switch-over valve of Fig. 2 in three different positions.

In Fig. 1, 1 is an electric motor which drives a refrigerant compressor 2 in which refrigerant vapor is compressed and supplied to a condenser 3 in which it is condensed and then flows through a pipe 4 and an automatic control valve 5 to a header pipe 6. From the latter the refrigerant is branched to three separate evaporators or coils 7, 8 and 9, the discharge ends of which are connected to a switch-over valve 14 through pipes 11, 12 and 13. A common return pipe 15 extends from the switch-over valve 14 back to the compressor 2. 10 is a fan and 16 a thermostat for starting and stopping the whole refrigerating system dependent on the temperature in the compartment to be cooled.

The valve 14 is illustrated in more detail and on a larger scale in Fig. 2. It consists of a valve housing 21 with a cover 22, in which housing there is provided a valve body 23, which is urged by means of a spring towards a valve seat formed on the bottom side of the cover 22. The valve body 23 is rotatably mounted and is coupled through a transmission gearing 24 with a very high step down ratio to a turbine wheel 25. 26 is a by-pass valve by means of which a discharge opening 30 of the housing 21 above the turbine wheel 25 and a second discharge opening 31 from the housing 21 below the turbine wheel 25 can be connected to a discharge spout 32 which is connected to the pipe 15 of Fig. 1. 29 is a passage in the cover 22 to which the pipe 11 in Fig. 1 is connected. Corresponding passages are provided for each one of the two other pipes 11 and 13. The passage 29 opens at the valve seat formed by the bottom side of the cover 22 in the form of a port 41, see Figs. 3 and 4, and also has a branch passage connected to another port 41a. This branch passage can be closed or opened by means of a valve screw 27, Fig. 2, upon removal of a screw plug 28. Similarly, the pipes 12 and 13 open at the valve seat in the form of ports 42, 42a and 43, 43a, of which those marked by the letter a can be opened or closed by means of valve screws similar to the valve screw 27.

The valve body 23 has an inner port 44 which is located on the same diameter as the openings 41, 42 and 43 of the valve seat, and also a marginal opening 45 located at the same diameter as the openings 41a, 42a and 43a.

The operation is as follows:

As is apparent from Figs. 3 and 4, at least one of the ports of the valve seat will at any time be uncovered by the valve body 23. Through this port or ports refrigerant vapor flows from the respective pipe or pipes 11, 12 and 13 into the valve housing and from there through the turbine wheel 25 and the discharge opening 31 to the discharge spout 32, and from the latter through the pipe 15 to the compressor 2. Under the influence of this flow of the refrigerant vapor the turbine wheel 25 is set in rotation thereby in turn rotating the valve body 23 through the transmission gearing 24 at a speed of rotation which is stepped down at a very high ratio.

By this rotation of the valave body 23 the different openings of the valve seat are opened and closed in cyclic succession, so that a switch-over is performed between the different evaporators 7, 8 and 9.

Assuming first that the valve screw 27 and the corresponding valve screws of the two other evaporator connections are in the position shown in Fig. 2, then only the inner row of openings 41, 42 and 43, see Figs. 3 and 4, will be in operation, and these are set free individually in succession by means of the inner opening 44 of the valve body 23, though with some overlap. Thus, on principle only one evaporator 7, 8 or 9 will be in operation at a time, while the two others are inactive, though there will be some overlap between the periods of operation of the evaporator which is at any time being put out of operation and the new evaporator which is being put in operation.

If, upon removal of the screw plug 8, the valve screw 7 is screwed back, and the other similar valve screws are similarly screwed back so that they no longer close the branch passages extending to the openings 41a, 42a and 43a, these openings will also be active and thus will be opened and closed in cyclic succession by means of the marginal hole 5 of the valve body. In the embodiment shown, the marginal hole 5 is displaced relative to the inner opening 44 of the valve body through an angle such that on principle two evaporators will be in operation at a time, though also in this case with a certain overlap, so that all three evaporators will be in operation during short transition intervals. Thus, an entirely different cycle has been established in which two evaporators are active at a time while the third evaporator is inactive.

By using a greater number of openings and a greater number of valve screws, it will be possible in refrigerating systems having a greater number of evaporators, to obtain further variations between different working cycles. Also, in systems having two or three evaporators, it will be possible by similar means to vary the duration of the periods of operation and overlap.

As mentioned, a discharge opening 30 is also provided above the turbine wheel 25 which opening 30 can be connected to the discharge spout 12 through the by-pass valve 6. In Fig. 2, the by-pass valve 6 is shown in an intermediate position in which there is direct and substantially non-throttled communication between both discharge openings 30 and 31 and the discharge spout 32. The flow of refrigerant vapor will therefore be subdivided into two branch flows of which one passes through the turbine wheel 25 while the other by-passes the latter. This position of operation is illustrated on a larger scale in Fig. 6. In Fig. 5, the by-pass valve 26 is displaced so that there is only access from the discharge opening 30 to the discharge spout 32, i.e. the whole quantity of refrigerant vapor bypasses the turbine wheel to render the valve 14 inoperative. Fig. 7 illustrates a position of the by-pass valve 6 in which there is only access from the discharge opening 31 to the discharge spout 32, so that the whole quantity of refrigerant vapor is forced to pass through the turbine wheel 25. By setting the by-pass valve 6 in intermediate positions, the ratio between the quantities of refrigerant vapor passing through the turbine and by-passing the latter respectively can be adjusted at will. In this manner, it is possible at a given rate of flow of the refrigerant vapor, to vary the speed of rotation of the turbine wheel 25 and thus the period of switching over between the various evaporators.

I claim:

A switch-over device for use in an evaporation type refrigerating system having a plurality of evaporators connected in parallel and intended for successive operation, said device comprising a housing, a valve seat formed in said housing and having a plurality of annularly arranged inlet ports intended for connection to the respective evaporators of the system, a rotary valve body mounted for cooperation with said valve seat, said valve body having a through port in a position such as to register with said inlet ports of the valve seat successively on rotation of said valve body, said through port extending circumferentially relative to the rotational axis of said valve body for a distance greater than the space between adjoining inlet ports to partially register with two such inlet ports at once at certain times during its rotation of said valve body, a turbine mounted in said housing in a position such as to receive refrigerant vapor that has passed through ports of said valve seat and valve body, an outlet opening provided in said housing on the discharge side of said turbine, and step down transmission gearing drivably connecting said valve body to said turbine.

References Cited in the file of this patent

UNITED STATES PATENTS

| | | |
|---|---|---|
| 2,081,510 | Smart | May 25, 1937 |
| 2,359,780 | Muffly | Oct. 10, 1944 |